United States Patent
Dandeneau et al.

(10) Patent No.: US 10,590,005 B2
(45) Date of Patent: Mar. 17, 2020

(54) SINGLE STEP SOLUTION COMBUSTION SYNTHESIS OF CRYSTALLINE TRANSURANIC-DOPED RARE EARTH ZIRCONATE PYROCHLORES

(71) Applicant: Savannah River Nuclear Solutions, LLC, Aiken, SC (US)

(72) Inventors: Christopher S. Dandeneau, Aiken, SC (US); Jake W. Amoroso, Aiken, SC (US)

(73) Assignee: Savannah River Nuclear Solutions, LLC, Aiken, SC (US)

(*) Notice: Subject to any disclaimer, the term of this patent is extended or adjusted under 35 U.S.C. 154(b) by 171 days.

(21) Appl. No.: 15/936,615

(22) Filed: Mar. 27, 2018

(65) Prior Publication Data

US 2019/0300384 A1    Oct. 3, 2019

(51) Int. Cl.
| | |
|---|---|
| C01G 56/00 | (2006.01) |
| C01G 25/00 | (2006.01) |
| C01F 17/00 | (2020.01) |
| C01B 21/20 | (2006.01) |
| C01B 21/04 | (2006.01) |

(52) U.S. Cl.
CPC ........ C01G 56/003 (2013.01); C01F 17/0018 (2013.01); C01G 25/006 (2013.01); C01B 21/0422 (2013.01); C01B 21/20 (2013.01); C01P 2002/72 (2013.01)

(58) Field of Classification Search
CPC .. C01G 56/003; C01G 25/006; C01F 17/0018
USPC ................................. 423/250, 263
See application file for complete search history.

(56) References Cited

FOREIGN PATENT DOCUMENTS

| IN | 00016MU2011 | 3/2011 |
| KR | 20120139107 | 12/2012 |
| KR | 101553294 | 9/2015 |
| WO | WO2017143978 | 8/2017 |

OTHER PUBLICATIONS

Mukasyan et al, Novel Approaches to Solution-Combustion Synthesis of Nanomaterials. A.S. Mukasyan and P. Dinka, 2007.
Muthuraman et al, Combustion Synthesis of Oxide Materials for Nuclear Waste Immobilization, M. Muthuraman, N. Arul Dhas and K.C. Patil, Nov. 1994.
Han et al, Synthesis of Multiphase SYNROC Powders as a High Level Radioactive Waste Ceramic Forms by a Solution Combustion Synthesis, Han, Young-Min, Jung, Soo-Ji, Yewon-Ku, Jung, Choong-Hwan, 2015.
Jung et al, Effects of Fuel Synthesis of CaTiO sub(3) by Solution Combusttion Synthesis for High Level Nuclear Waste Ceramics, Jung, Chhong-Hwa; Kim, Yeon-Kuk; Han, Young-Min; Lee, Sang-Jin, Feb. 1, 2016.
Mukasyan, Solution Combustion as a Promising Method for the Synthesis of Nanomaterials. Alexander S. Mukasyan,, 2010.
N. Arul Dhas et al Combustion Synthesis and Properties of Fine-particle Rare earth metal Zirconates, Ln2Zr2O7, J. Mater, Chem., 3(12), pp. 1289-1294 (1993).
Jafar et al, Preparation and Structure of Uranium-Incorporated Gd2Zr2O7 Compounds and Their Thermodynamic Stabilities under Oxidizing and Reducing Conditions, Inorg. Chem. pp. 9447-9457.
Varma et al, Solution Combustion Synthesis of Nanoscale Materials, Chemical Reviews, Sep. 9, 2016.
Han et al, Synthesis of Nono-Polycrystalline Synroc-B Powders as a High Level Radiocative Wasts]e Ceramic Forms by a Solution Combustion Synthesis, Feb. 2016.

Primary Examiner — Steven J Bos
(74) Attorney, Agent, or Firm — Dority & Manning, P.A.

(57) ABSTRACT

One-step solution combustion synthesis (SCS) methods for fabricating durable crystalline transuranic-doped rare earth zirconium pyrochlores are described. Methods are fast, amenable to upscaling, and present a simple strategy for producing crystalline ceramic materials that meet the minimum attractiveness criteria for special nuclear material. The methods include analysis of reactants and reaction conditions to select proper fuel as well as proper fuel content so as to encourage formation of the crystalline product in a single-step synthesis procedure.

20 Claims, 1 Drawing Sheet

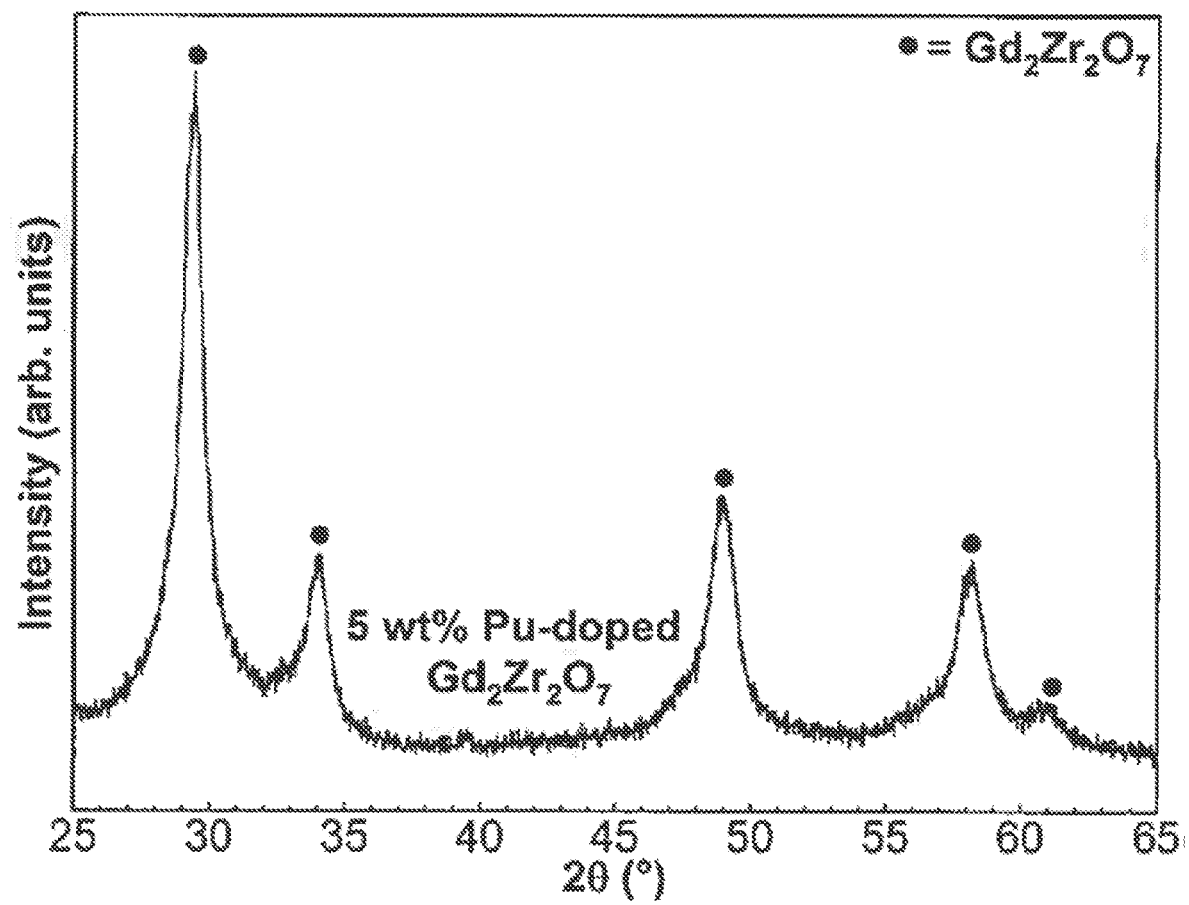

SINGLE STEP SOLUTION COMBUSTION SYNTHESIS OF CRYSTALLINE TRANSURANIC-DOPED RARE EARTH ZIRCONATE PYROCHLORES

FEDERAL RESEARCH STATEMENT

This invention was made with government support under contract no. DE-AC09-08SR22470 awarded by the U.S. Department of Energy. The government has certain rights in the invention.

BACKGROUND

The immobilization of transuranic elements (e.g., neptunium, plutonium, americium, etc.) in a stable matrix is useful primarily for safely containing waste materials in a solidified waste form, but is also attractive in other applications including in manufacturing inert matrix fuels for transmutation and in the production of targets for irradiation and particle physics research. Several ceramics have been assessed as matrix materials including oxides (e.g., $ZrO_2$, MgO, $Al_2O_3$, $MgAl_2O_4$, $Y_3Al_5O_{12}$, $CeO_2$ and pyrochlores), nitrides (e.g., ZrN) and composites (e.g. glass-ceramic, ceramic-ceramic and ceramic-metal).

Pyrochlores are ternary metal oxides with the general formula $A_2B_2O_7$. Rare earth pyrochlores are pyrochlores in which A denotes a rare earth cation and B typically represents a transition metal capable of octahedral coordination. Rare earth zirconium pyrochlores (e.g., gadolinium zirconate, $Gd_2Zr_2O_7$), show promise for use as a durable storage matrix for immobilizing transuranic actinides due to their high-temperature stability, high corrosion resistance, and excellent radiation resistance.

One preferred method for forming pyrochlores is solution combustion synthesis (SCS). In the SCS process, liquid solutions containing suitable metal salts (typically metal nitrates) and a reducing agent as the fuel are prepared. The fuel for an SCS process is classified based on its chemical structure, i.e., the type of functional groups in the molecule (e.g., amino, hydroxyl, carboxyl). Beneficially, the use of liquid solutions in SCS allows for mixing of the reactants on the molecular level. Upon initiation of an SCS reaction, the fuel and oxygen formed during decomposition of the oxidizer react to provide suitable conditions for a rapid high-temperature, self-sustaining formation reaction.

The broad spectrum of compositions possible in the pyrochlore system allows a range of tri and tetra-valent transuranic elements to be incorporated into durable ceramic frameworks. As such, SCS would appear to be an excellent candidate for use in the synthesis of transuranic-doped pyrochlores. Unfortunately, it has proven difficult to induce crystallinity in as-formed zirconate pyrochlores and as a result, formation methods must include prolonged post-annealing treatments to induce crystallization. Moreover, when considering the doping of pyrochlores with transuranic elements, the incorporation of these elements into the ceramic is not a trivial matter. For instance, transuranic nitrate solutions may contain impurities that induce the formation of precipitates in the precursor solution. Nitric acid is also itself an oxidizer, and the introduction of transuranic dopants from nitrate solutions alters the targeted fuel to oxidizer ratio for a given reaction. As such, currently known SCS procedures for incorporating transuranic elements into a stable ceramic are both time and energy intensive and therefore quite costly.

What are needed in the art are methods for incorporating transuranic elements into rare earth zirconate pyrochlores. Rapid and low-cost methods for forming transuranic-doped zirconate pyrochlores that meet the minimum attractiveness criteria for special nuclear material (SNM) would be of great benefit.

SUMMARY

According to one embodiment, disclosed is a method for forming a transuranic-doped rare earth zirconate pyrochlore according to the following reaction:

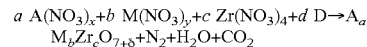
$$a\ A(NO_3)_x + b\ M(NO_3)_y + c\ Zr(NO_3)_4 + d\ D \rightarrow A_a M_b Zr_c O_{7+\delta} + N_2 + H_2O + CO_2$$

wherein
A is a rare earth element;
M is a transuranic element;
D is a fuel exhibiting a low complexing ability toward nitrates of A, M, and Zr (e.g., a monodentate fuel, urea, hydrazine);
$0.00 < a \leq 2$;
$0.00 < b \leq 2$;
$0.00 < c \leq 2$;
d is the molar fuel content;
x and y are independently 3 or 4; and
$\delta$ is positive or negative quantity representing an increase or reduction in the oxygen content as needed for charge compensation in the event that free electrons or holes are not generated.

A method can include determination of the fuel content to be used in the reaction so as to provide an oxidizer to fuel ratio that will encourage formation of a crystalline reaction product. Fuel content determination can include selecting an elemental stoichiometric coefficient (ESC) for the reaction (e.g., ESC=1 for stoichiometric fuel content, ESC<1 for a fuel-rich reaction, and ESC>1 for a fuel-lean reaction). Using this selected ESC and the formula for the desired pyrochlore reaction product, a value for the molar content of fuel (d in the above reaction) can be determined through analysis of the particular oxidizing and reducing agents to be used in the reaction.

Once the coefficient of the fuel (d in the above reaction) based on the chosen ESC has been determined, a method can include forming an aqueous solution that includes stoichiometric quantities of the rare earth nitrate ($A(NO_3)_x$ in the above reaction), the zirconium nitrate ($Zr(NO_3)_4$ in the above reaction) and the monodentate fuel. This aqueous solution can then be combined with a sufficient quantity of a transuranic-containing solution to supply a stoichiometric quantity of the transuranic element (e.g., a nitric acid solution of the transuranic dopant) in order to form a precursor solution. Upon addition of energy to the precursor solution (e.g., furnace heating, microwave irradiation, etc.), the self-sustaining SCS reaction can be initiated. Beneficially, the product can be a crystalline transuranic-doped rare earth zirconate pyrochlore and as such, further processing (e.g., calcining) to obtain the crystalline form of the pyrochlore is not necessary.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which:

FIG. 1 presents an X-ray diffraction pattern obtained for as-formed 5 wt. % Pu-doped gadolinium zirconate formed as described herein.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment may be used in another embodiment to yield a still further embodiment.

In general, disclosed is a one-step solution combustion synthesis (SCS) method for fabricating durable crystalline transuranic-doped rare earth zirconium pyrochlores. The method is fast, amenable to upscaling, and presents a simple strategy for producing a crystalline ceramic material that, among other benefits, meets the minimum attractiveness criteria for SNM. The SCS process and the doped pyrochlores formed thereby are also applicable to other applications (e.g., transmutation targets) in which currently known formation processes employ traditional solid-state sintering technologies to provide the crystalline product. The SCS process described herein can provide a rapid and simple processing route while simultaneously enabling improved mixing/homogeneity of the precursors as well as crystalline products.

By proper recognition of issues related to pyrochlore formation using the SCS process, crystalline products can be rapidly formed from the energy released in a single-step, self-sustaining exothermic reaction, thereby eliminating the need for prolonged post-annealing treatments to induce crystallization. The disclosed method has numerous advantages, including (1) the production of crystalline ceramics in a simple, efficient conversion process, (2) strict compositional control since intermixing of the constituent elements occurs at the molecular level in solution, and (3) ease of scalability and the use of modular components, which facilitates remote deployment and custom configuration. Through utilization of disclosed methods, processing time can be greatly reduced and overall efficiency can be improved when compared to traditional sinter/ceramic techniques.

In developing disclosed methods, difficulties associated with inducing crystallinity in zirconate pyrochlores via SCS have been addressed. Primary among these difficulties are issues related to the total content of oxidizing agents and the effectiveness of the oxidizing agents available in the precursor solution, the proper analysis of the multiple roles played by the fuel during the SCS process, and the necessity for proper adjustment of the ratio of oxidizer to fuel during the combustion process so as to control the self-sustaining reaction and encourage formation of the crystalline product.

In traditional SCS processes, the zirconium source is typically zirconium oxynitrate ($ZrO(NO_3)_2$). Unlike SCS, many wet chemistry processes (e.g., sol-gel synthesis) do not exploit the exothermicity of redox reactions to induce crystallinity and thus, only secondary consideration has traditionally been given to the activity of the zirconium source as an oxidizing agent. When compared to $Zr(NO_3)_4$, $ZrO(NO_3)_2$ is not as effective as an oxidizer due to the absence of oxidizing nitrate groups.

In development of the present methods, it has been discovered that in order to promote formation of the crystalline product, the ratio of the oxidizer to the fuel should be more tightly controlled than in traditional methodologies. In one embodiment, this ratio can be better controlled through selection of a more effective oxidizer as the zirconium source, i.e., the zirconium source provides not only the zirconium but also an effective, controllable amount of nitrate ion as oxidizer. Accordingly, in one embodiment, the zirconium source for the SCS process can be selected to include zirconium nitrate ($Zr(NO_3)_4$) which is a more effective oxidizer than is zirconium oxynitrate. In other embodiments, the pentahydrate form can be utilized.

In addition to selecting an efficient oxidizer as a zirconium source, the zirconium source can be provided to the SCS process in an aqueous solution, rather than in a nitric acid solution, as has been utilized in the past. Utilization of an aqueous solution can serve to better control the content of oxidizing agent in the reaction and thus better control the oxidizer to fuel ratio of the SCS process, as the total amount of oxidizing component can be more accurately accounted for.

The presently disclosed methods also take into account the multiple roles played by the fuel in an SCS process. For instance, in addition to reacting with oxygen during the combustion process, the fuel also can form a complex with metals in the precursor solution. Many SCS processes typically use amino acids such as glycine ($NH_2CH_2COOH$) as the fuel. The bulk of such typical fuels are multidentate compounds (e.g., glycine is a bidentate fuel), and as such can form a relatively strong complex with metals in the precursor solutions. During the formation reaction, the strong complexes formed by multidentate fuels can hinder combustion of the fuel and reaction of the metals and thus can decrease the likelihood of forming a crystalline product solely from the energy released in an exothermic reaction.

To improve this aspect of the SCS process, the disclosed processes utilize a fuel that exhibits low complexing ability toward nitrates of the reactants (rare earth elements, transuranic elements, zirconium). The complexing ability of the fuel can be ascertained by appropriate spectroscopic techniques (e.g., Raman spectroscopy). In one embodiment, the fuel can include a monodentate fuel, which can still form a complex with metals in the precursor solution, as desired, but the complexes formed will be more easily broken in order that the constituents of the fuel are available for reaction during the combustion stage of the process and the metals are available for formation of the pyrochlore. As such, the process can exhibit a more complete reaction, leading to the desired formation of the crystalline product.

Monodentate fuels as encompassed herein can include, without limitation, mono-functional hydrocarbons including amino, hydroxyl, or carboxyl functionality. By way of example, urea can be utilized as fuel in one embodiment. Another example of a fuel that exhibits a low complexing ability toward nitrates of the reactants is hydrazine.

Disclosed methods can also provide an oxidizer to fuel ratio in the precursor solution that can encourage formation of the crystalline product. More specifically the oxidizer to fuel ratio in the SCS process can be controlled through predetermination and tight control of the fuel content of the precursor solution. In one embodiment, the parameter known as the elemental stoichiometric coefficient (ESC) can be utilized to determine a fuel content for the precursor solution. As utilized herein, the term "elemental stoichiometric coefficient" or "ESC" is defined as the ratio of the total oxidizer valences to fuel valences in the SCS reaction that is used to form the targeted pyrochlore.

To calculate the fuel content to be included in the precursor solution, the ESC, which has been derived in previous research from the concepts of propellant chemistry, is initially selected. For an ESC value of unity, the conditions of the reaction are deemed to be stoichiometric, i.e., no ambient oxygen is required when the reaction is conducted in air. Solutions with an ESC value greater than unity are described as fuel-lean ($O_2$ is a product in the reaction), while those with an ESC value less than unity are fuel-rich (ambient $O_2$ is included as a reactant). In selecting a value for the ESC, the ESC can be employed as a basis from which the oxidizer to fuel ratio in the reaction can be ideally termed stoichiometric and then subsequently adjusted depending upon the specific conditions of the application. For instance, in those embodiments in which one of the reactants is provided in a solution that also provides an oxidizer (e.g., a nitric acid solution), selection of an ESC for a fuel-rich solution (e.g., ESC is less than 1) may be used to provide an oxidizer to fuel ratio in the reaction that will form the crystalline product. On the other hand, when considering an embodiment in which all sources of oxidizing agents (e.g., nitrate ion) can be completely accounted for, an ESC of 1 can be selected. In one embodiment, discussed in more detail in the examples section below, the precursor solution can be formed of a mixture of an aqueous solution that carries a rare earth source, a zirconium source, the fuel, and a nitric acid solution that carries a transuranic dopant. As such, in this embodiment, the precursor solution can provide excess oxidizer and in determining the fuel content of the precursor solution, it may be beneficial to select an ESC value to provide a fuel-rich precursor solution (if the excess nitrate ions from nitric acid are not considered), i.e., selection of an ESC of less than 1, for instance selection of an ESC from about 0.4 to about 0.7, or about 0.5 in some embodiments, with a higher nitric acid content in the precursor solution suggesting selection of a lower ESC value.

In those embodiments in which the content of nitrate ions present from the nitric acid at the start of a reaction is known, an ESC of 1 can be used assuming that the nitrate ions are accounted for. Based on the structure of the as-synthesized powder, the ESC can be adjusted appropriately in subsequent fabrication procedures.

In the event that the environment prior to initiating an SCS reaction has oxygen content lower than that in the atmosphere at sea-level, an ESC value greater than 1 may be necessary to account for the reduction in oxygen.

Following selection of the ESC value, an analysis of the reaction can be carried out to determine an optimal fuel content to be used in the precursor solution. In general, the reaction for forming a transuranic-doped zirconate pyrochlore can be described as:

$$a\ A(NO_3)_x + b\ M(NO_3)_y + c\ Zr(NO_3)_4 + d\ D \rightarrow A_a M_b Zr_c O_{7+\delta} + N_2 + H_2O + CO_2$$

wherein

A includes one or more rare earth elements (one or more elements having an atomic number of 39 or 57 to 77);

M includes one or more transuranic elements (one or more elements having an atomic number of from 93 to 103);

D is a fuel exhibiting a low complexing ability toward nitrates of A, M, and Zr;

0.00<a≤2;
0.00<b≤2;
0.00<c≤2;
d is the molar fuel content;
x and y are independently 3 or 4; and δ is a positive or negative quantity representing an increase or reduction in the oxygen content as needed for charge compensation in the event that free electrons or holes are not generated.

In one embodiment, a=2−b and c=2 in the above general formula and the reaction can form a doped pyrochlore having the following structure:

$$2-b\ A(NO_3)_x + b\ M(NO_3)_y + 2\ Zr(NO_3)_4 + d\ D \rightarrow A_{2-b}M_bZr_2O_{7+\delta} + N_2 + H_2O + CO_2$$

In another embodiment, the reaction can include substitution of the transuranic element for a zirconium (i.e., a=2, b=1, c=1 in the above general formula), and the reaction can form a pyrochlore having the following structure:

$$2\ A(NO_3)_x + M(NO_3)_y + Zr(NO_3)_4 + dD \rightarrow A_2MZrO_{7+\delta} + N_2 + H_2O + CO_2$$

As defined above, the ESC value is equivalent to the ratio of the total oxidizer valences to fuel valences of the reaction. In one embodiment, it can be assumed that the products of the reaction are only the desired pyrochlore, diatomic nitrogen ($N_2$), water vapor ($H_2O$), and carbon dioxide ($CO_2$) per the above reaction scheme. In this embodiment, the valence of nitrogen can be taken to be zero, as this element can be assumed to be neither an oxidizer or a reducer. It should be noted however that in other embodiments the formation of other/additional gaseous nitrogen compounds may occur during SCS and thus, the valence of nitrogen can in some cases deviate from zero, as would be evident to one of skill in the art. This can be accounted for by adjusting the total oxidizer and fuel valences accordingly.

In addition to selection of the ESC, the total valence for each compound in the reaction can be determined by multiplying the coefficient of each element in the specific product formula by the valence of its associated compound in the reaction. As is typical, oxidizing agents can be considered to have a negative valence while reducing agents (e.g., the fuel) can be considered to have a positive valence. Of course, any suitable assignment can be utilized, provided it is consistent throughout the characterization. The valences of all of the oxidizing and reducing agents can then be computed, with the stoichiometric coefficient of the fuel (d in the above general reaction) set as a variable.

To determine the fuel content of the precursor solution, the selected ESC value can be set to be equivalent to the absolute value of the sum of the oxidizing agent valences divided by the sum of the reducing agent valences (e.g., the fuel valence), with the coefficient of the latter (i.e., the moles of fuel in the reaction) being set as a variable as mentioned. By solving this equation, the stoichiometric coefficient of the fuel component of the reaction can be determined (d in the above formulas). This stoichiometric coefficient can then be used to formulate the complete SCS formation reaction and obtain the relative amounts of each reactant to be incorporated in the precursor solution.

By way of example, a process can be designed for forming a plutonium-doped gadolinium zirconate pyrochlore of the following structure:

$$Gd_{1.9}Pu_{0.1}Zr_2O_{7.05}$$

Initially, the ESC value can be selected based upon the reaction conditions. For this example, the conditions of the reaction can be assumed to be stoichiometric and as such the ESC is selected to be 1. In conjunction with selection of the ESC, the total valence for each compound in the formation reaction can be determined. By way of example, the process can be designed for formation of the above pyrochlore by reaction of $Gd(NO_3)_3$ as gadolinium source, $Pu(NO_3)_4$ as plutonium source, $Zr(NO_3)_4$ as zirconium source and using urea as the fuel with no additional nitrogen species beyond diatomic nitrogen being formed. The valence for each compound can be based on known concepts used in propellant chemistry. For instance, the elements C, H, Zr can be considered as reducing species with the valences of +4, +1, +4, respectively (or the valence of the metal ion in that compound), and the element oxygen can be considered as an oxidizer having a valence of −2. As stated, the reaction can be assumed to form no additional nitrogen species and as such the valence of nitrogen can be considered as zero. According to this approach, the oxidizing valence for $Gd(NO_3)_3$ would be −15, for $Pu(NO_3)_4$ would be −20, for $Zr(NO_3)_4$ would be −20, and the reducing valence for urea would be +6. The total valence for each compound in the formation reaction can then be calculated as follows:

$Gd(NO_3)_3 = (1.9)(-15) = -28.5$ $Pu(NO_3)_4 = (0.1)(-20) = -2$ $Zr(NO_3)_4 = (2)(-20) = -40$ $CH_4N_2O = (d)(6) = 6d$

By setting the ESC equivalent to the ratio of the absolute value of the sum of the oxidizer valences to the fuel valence, the stoichiometric coefficient for the fuel, d, can be determined. For instance in this example, $$ESC = \frac{ABS(-28.5 - 2 - 40)}{6d} = 1$$
$$d = \frac{47}{4}$$

Using this value, the complete reaction would then be:

1.9 $Gd(NO_3)_3$ + 0.1 $Pu(NO_3)_4$ + 2 $Zr(NO_3)_4$ + (47/4) $CH_4N_2O \rightarrow Gd_{1.9}Pu_{0.1}Zr_2O_{7.05}$ + (94/5) $N_2$ + (47/2) $H_2O$ + (47/4) $CO_2$ Upon formulation of the balanced reaction, the precursor solution can be formed in the determined stoichiometric quantities and the SCS process initiated. For instance, the rare earth compound, zirconium compound, and the fuel can be provided in the appropriate quantities as determined by the reaction formulation and then dissolved in a minimum quantity of water under vigorous stirring to provide an aqueous solution.

This aqueous solution can then be combined with a second solution including the transuranic dopant, e.g., a transuranic/nitric acid solution. This combining can generally be carried out under stirring and if necessary, heating (e.g., at temperatures of up to 110° C.) so as to form a homogeneous SCS precursor solution.

Energy can be added to the precursor solution to initiate the self-sustaining combustion reaction. For example, the precursor solution can placed in a furnace where, upon heating of the precursor solution and evaporation of the water, a self-sustaining redox reaction can be initiated. Any suitable energy source can be used, (e.g., microwave irradiation, induction heating etc.) for providing the necessary initiation energy.

The SCS reaction process itself can be carried out under conditions similar to those of previously known SCS pyrochlore formations. For instance, through energy addition, the precursor solution can be heated in a furnace that is heated to a temperature of from about 350° C. to about 750° C. to initiate the autocatalytic formation process.

Through formation of the precursor solution as described herein, the energy released in the exothermic redox reaction is sufficient to maintain the self-sustaining reaction and to form a crystalline transuranic-doped rare earth zirconate pyrochlore with no post-annealing step.

The disclosed methods can be utilized in applications that currently employ traditional sintering/ceramic processes and can provide reduction in processing time, improvement in product homogeneity, and increases in efficiency, all of which being advantageous. Government and commercial entities that are tasked with treating transuranic materials for disposal, remediation, and other nuclear applications can beneficially employ disclosed methods (e.g., disposal of plutonium, neptunium, americium, curium, or combinations thereof). Additional potential end users include manufacturers of target materials, fuels, and waste products.

The present disclosure may be better understood with reference to the Examples set forth below.

EXAMPLE

To demonstrate the viability of the method, gadolinium zirconate (GZO) doped with 5 wt % Pu was formed. The ESC was selected to be 0.5.

Stoichiometric quantities of solid $Gd(NO_3)_3 \cdot 6H_2O$ (gadolinium nitrate hexahydrate), $Zr(NO_3)_4$ (zirconium nitrate), were first added to a minimum quantity of water. The solution was then stirred under gentle (~65° C.) heating to obtain a clear, homogenous solution. A sufficient quantity of $CO(NH_2)_2$ (urea) as a fuel was then introduced to the above solution to ensure an ESC value of 0.5. While stirring the above solution on a hot plate at temperatures from 85° C. to 100° C., a solution of plutonium dissolved in nitric acid was added to provide the necessary quantity of plutonium ions. Upon obtaining a homogenous solution containing urea and nitrates of Gd, Zr, and Pu, the solution was transferred to an Erlenmeyer flask and placed inside a furnace preheated to a temperature of 550° C. After approximately 5-10 minutes, white smoke was visible (a commonly observed phenomenon just prior to the initiation of an SCS reaction). With no adjustments to the furnace temperature controller, a brief increase of about 10° C. was observed inside the furnace, indicating the initiation of the SCS reaction. At this point, power to the furnace was shut off and the interior of the furnace was allowed to cool to room temperature. The as-synthesized powder was then collected in glass containers for further analysis.

Shown in FIG. 1 is an X-ray diffraction (XRD) pattern obtained for the as-processed 5 wt % Pu-doped GZO fabricated via the developed SCS method. All peaks in the pattern can be referenced to crystalline $Gd_2Zr_2O_7$, indicating that the plutonium did not form a secondary phase and was instead incorporated into the GZO structure.

While certain embodiments of the disclosed subject matter have been described using specific terms, such description is for illustrative purposes only, and it is to be understood that changes and variations may be made without departing from the spirit or scope of the subject matter.

What is claimed is:

1. A method for forming a transuranic-doped rare earth zirconate pyrochlore according to a reaction comprising:

$a\ A(NO_3)_x + b\ M(NO_3)_y + c\ Zr(NO_3)_4 + d\ D \rightarrow A_a M_b Zr_c O_{7+\delta} + N_2 + H_2O + CO_2$ wherein
A is a rare earth element;
M is a transuranic element;

D is a fuel exhibiting a low complexing ability toward nitrates of A, M, and Zr;

$0.00 < a \leq 2$;

$0.00 < b \leq 2$;

$0.00 < c \leq 2$;

d is the molar fuel content;

x and y are independently 3 or 4; and

δ represents a change in the oxygen content as needed for charge compensation;

the method comprising:

selecting an elemental stoichiometric coefficient for the reaction;

determining a fuel content for the reaction based upon the selected elemental stoichiometric coefficient;

forming an aqueous solution comprising stoichiometric quantities of the $A(NO_3)_x$, the $Zr(NO_3)_4$ and the fuel;

combining the aqueous solution with a solution comprising a stoichiometric quantity of the $M(NO_3)_y$ to form a precursor solution; and adding energy to the precursor solution, the energy initiating the reaction according to a self-sustaining solution combustion synthesis, the reaction forming the transuranic-doped rare earth zirconate pyrochlore, wherein the as-synthesized transuranic-doped rare earth zirconate pyrochlore is a crystalline pyrochlore.

2. The method of claim 1, wherein a=2−b and c=2.

3. The method of claim 1, wherein a=2, c=2−b.

4. The method of claim 1, wherein the fuel comprises a monodentate fuel.

5. The method of claim 1, wherein the fuel comprises urea, hydrazine, or a combination thereof.

6. The method of claim 1, wherein the transuranic element comprises one or more elements having an atomic number of 93 to 103.

7. The method of claim 1, wherein the rare earth element comprises one or more elements having an atomic number of 39 or 57 to 77.

8. The method of claim 1, wherein the reaction forms one or more additional nitrogen compounds.

9. The method of claim 1, wherein the selected elemental stoichiometric coefficient is less than 1.

10. The method of claim 1, wherein the selected elemental stoichiometric coefficient is greater than 1.

11. The method of claim 1, wherein the selected elemental stoichiometric coefficient is 1.

12. The method of claim 1, wherein the fuel content is determined according to a process that includes determining the total valence for each compound in the reaction and setting the selected elemental stoichiometric coefficient equal to the ratio of the absolute value of the sum of oxidizing agent valences to the absolute value of the sum of reducing agent valences.

13. The method of claim 1, wherein the solution comprising the stoichiometric quantity of the $M(NO_3)_y$ comprises nitric acid.

14. The method of claim 1, wherein the step of adding energy to the precursor solution comprises locating the precursor solution in a furnace.

15. The method of claim 1, wherein the step of adding energy to the precursor solution comprises directing microwave energy at the precursor solution.

16. The method of claim 1, wherein the step of adding energy to the precursor solution comprises induction heating of the precursor solution.

17. The method of claim 1, wherein the self-sustaining solution combustion synthesis takes place at a temperature of from about 200° C. to about 750° C.

18. The method of claim 1, wherein the transuranic-doped rare earth zirconate pyrochlore is a component of a solid waste.

19. The method of claim 1, wherein the transuranic-doped rare earth zirconate pyrochlore is an inert matrix fuel.

20. The method of claim 1, wherein the transuranic-doped rare earth zirconate pyrochlore is a transmutation target.

* * * * *